United States Patent [19]

Pitts

[11] 4,126,663

[45] Nov. 21, 1978

[54] PROCESS FOR RECOVERING VANADIUM VALUES FROM ACIDIC SULFATE SOLUTION

[75] Inventor: Frank Pitts, Magalas, France

[73] Assignee: Engelhard Minerals & Chemicals Corporation, Edison, N.J.

[21] Appl. No.: 842,734

[22] Filed: Oct. 17, 1977

[51] Int. Cl.$^2$ .............................................. C01G 31/00
[52] U.S. Cl. ....................................... 423/63; 423/64; 423/67; 423/68; 423/166; 423/144; 423/65; 423/DIG. 14
[58] Field of Search ....................... 423/62, 63, 65, 68, 423/166

[56] References Cited

U.S. PATENT DOCUMENTS

| | | | |
|---|---|---|---|
| 1,392,745 | 10/1921 | Copelin | 423/65 |
| 3,206,277 | 9/1965 | Burwell et al. | 423/65 |
| 3,320,024 | 5/1967 | Burwell | 423/65 |
| 3,792,150 | 2/1974 | Maxwell et al. | 423/62 |

*Primary Examiner*—Herbert T. Carter
*Attorney, Agent, or Firm*—Inez L. Moselle

[57] ABSTRACT

A process for the recovery of vanadium from acid sulfate solutions such as those derived by sulfuric acid leaching of industrial residues such as spent hydrodesulfurization catalysts, fly ash and furnace bottom ash in which magnesium oxide, hydroxide or carbonate is used as the neutralizing agent.

2 Claims, No Drawings

PROCESS FOR RECOVERING VANADIUM VALUES FROM ACIDIC SULFATE SOLUTION

BACKGROUND OF THE INVENTION

Many industrial process residues contain vanadium in association with other inorganic constituents such as carbon and sulphur and the oxides of aluminum, silicon, iron, magnesium, calcium, sodium, potassium, nickel, cobalt and molybdenum. Such residues are often processed for recovery of the more valuable constituents, especially vanadium. Examples of residues of this type are spent hydrodesulfurization catalysts and fly ash and furnace bottom ash arising from the combustion of crude petroleum oil.

Vanadium is usually recovered by treating the residues with sulfuric acid which dissolves vanadium along with iron and other metals, separating undissolved material from the solution and then precipitating vanadium from the solution by oxidation followed by partial neutralization with ammonia and boiling, whereby there is precipitated a mixture of hydrous oxides of vanadium and iron known as "red cake." Such a process is described in a publication of William Whigham "NEW IN EXTRACTION: VANADIUM FROM PETROLEUM", CHEMICAL ENGINEERING, Mar. 1, 1965, pages 64–66. In order to obtain pure vanadium pentoxide it is necessary to effect further processing. For example, the red cake may by redissolved in sulfuric acid and the vanadium recovered by solvent extraction or liquid ion exchange. Such extraction processes are well known in the art; for example, one such process is described in "COMMERCIAL RECOVERY OF VANADIUM BY THE LIQUID ION EXCHANGE PROCESS" by R. R. Swanson, H. N. Dunning and J. E. House, ENGINEERING & MINING JOURNAL, October 1961. Whichever process is used, however, all the sulfuric acid which has not already been neutralized with ammonia has to be neutralized before disposal. This is usually effected by addition of lime or limestone and it results in the precipitation of calcium sulfate in admixture with the hydroxides of iron, aluminum and other metals. This precipitated material has no commercial value and has to be disposed of as waste. Moreover, the ammonium sulfate formed in the process is an undesirable constituent of liquid waste discharged as effluent and it also represents a loss of costly raw material unless the ammonia is recovered. This is usually done in the conventional manner of boiling with lime to volatize ammonia, which is then condensed and recycled.

It is an objective of the present invention to provide a simple process for the recovery of vanadium from acid sulfate solutions such as those derived by sulfuric acid leaching of residues of the type described above.

THE INVENTION

Briefly stated, the essence of the present invention resides in using a material selected from the group consisting of magnesium oxide, magnesium hydroxide, magnesium carbonate or mixtures thereof as the neutralizing agent in the processing of impure vanadiferous acid sulfate solutions to recover vanadium therefrom. In a preferred embodiment of the invention, a basic magnesium compound is used as the sole neutralizing agent during all of the steps that are employed in the processing of such acid sulfate solutions.

A preferred embodiment of the invention comprises a process for the extraction of vanadium from acidic sulfate solutions containing vanadium which comprises the steps of partially neutralizing the solution by addition of a material selected from the group consisting of magnesium oxide, magnesium hydroxide, magnesium carbonate and mixtures thereof, separating the vanadium from the solution by conventional means, neutralizing the residual solution by addition of a material selected from the group consisting of magnesium oxide, magnesium hydroxide, magnesium carbonate and mixtures thereof and separating insoluble material from the solution.

In an especially important aspect of this embodiment of the invention, the basic magnesium compound is employed in recovering vanadium in pentavalent state from iron-containing acid sulfate solutions. In the process according to the invention the acid sulfate solution is partially neutralized by addition of magnesium oxide, magnesium hydroxide, magnesium carbonate or mixtures thereof and the pentavalent vanadium is either precipitated along with iron as "red cake" if only a crude product is required or the vanadium is extracted by solvent extraction or liquid ion exchange if a pure product is required. Alternatively, if desired, the "red cake" may be redissolved in sulfuric acid and the vanadium then recovered by solvent extraction or liquid ion exchange. In any event, the residual vanadium-free acid liquors are neutralized with magnesium oxide, hydroxide, carbonate or mixtures thereof and the precipitated hydroxides of iron, aluminum and other metals are separated from the solution of magnesium sulfate, which may be sold as such or evaporated to produce crystalline hydrated magnesium sulfate for sale.

The process of the invention has considerable commercial advantage over the conventional processes in that substantially all the neutralizing agent is recoverable in saleable form and not as a waste material which has to be disposed of. Still another important commercial advantage is that partial neutralization prior to either "red cake" precipitation or solvent extraction or liquid ion exchange can be effected by direct addition of the neutralizing agent since this creates no undesirable insoluble material such as the calcium sulfate which would be formed if the prior art lime or calcium carbonate were used. The necessity to neutralize with ammonia and then to regenerate the ammonia for recycle by treating with lime is also avoided in the process of the invention.

PREFERRED EMBODIMENTS

In processing iron-containing vanadiferous acid sulfate solutions the basic magnesium compound is added in amount sufficient to adjust pH to a value in the range of about 1.2 to 3.2, usually 1.5 to 3.0, when vanadium is recovered by liquid ion exchange. The partially neutralized solution is contacted with an organic amine or quaternary ammonium compound to transfer vanadate ions from the aqueous to the organic phase. The two phases are separated and the aqueous phase, from which vanadium has been extracted, is neutralized to a pH of at least 3.5 with a basic magnesium compound followed by separating the ferruginous hydroxide precipitate from the solution of magnesium chloride and magnesium sulfate. Preferably the solution of magnesium sulfate is evaporated until hydrated magnesium sulfate crystallizes on cooling and is separated from the mother liquor.

When vanadium is to be precipitated as "red cake", the basic magnesium compound is added to the acid sulfate solution in amount sufficient to produce a pH in the range of 1.6 to 2.7, usually 1.7 to 2.5.

Pure grades of magnesium oxide, hydroxide or carbonate may be used in practice of the invention. However, impure sources of one or more of these materials may be employed. For example, tailings from talc beneficiation which have an appreciable content of basic magnesium materials may be used.

The following example is given for illustrative purposes and is not considered to be limiting the invention to the specific materials and procedures described therein. The example describes the recovery of vanadium from a typical fly ash obtained by combustion of crude residual oil in a steam raising boiler and containing vanadium, iron and one or more metals such as aluminum, chromium and manganese.

One thousand (1000) gm. of the fly ash containing 5% $V_2O_5$ by weight is boiled with a mixture of 500 gm sulfuric acid and 1500 gm. water for 2 hours.

The resulting slurry is filtered and the filter cake washed with water. The combined filtrate and washings are oxidized by passing chlorine through the solution until the E.M.F. against a standard electrode is 700 millivolts. The solution is then cooled to about 80° F. and, in accordance with the invention, the pH is adjusted to 1.8 by gradual addition of magnesium carbonate. The volume of the solution is 2500 ml. and it will contain 10.5 gm./liter V and 2.2 gm./liter Fe. The solution is then stirred for 20 minutes with 2500 ml. of an organic extractant with gradual addition of magnesium carbonate as required to maintain the pH at 1.8. The composition of the organic extractant is as follows:

| ALAMINE 336* | 10% by volume |
|---|---|
| KEROSENE | 80% by volume |
| ISO-DECANOL | 10% by volume |
| *ALAMINE 336 is a symmetrical, straight chain, saturated tertiary amine manufactured by General Mills, Inc. The alkyl groups are a $C_8$–$C_{10}$ mixture with the $C_8$ carbon chain predominating. It is also referred to as a commercial grade of TRI-CAPRYLYL AMINE. | |

The mixture is allowed to stand without stirring for 20 minutes and the lower aqueous layer is removed. To the remaining organic phase is added 2500 ml. of the stripping solution (1.0 molar $NH_4OH$, 1.5 molar $NH_4Cl$) and the mixture is stirred for 20 minutes at a temperature of 100° F. After allowing to stand without stirring for 20 minutes, the lower aqueous layer is removed and analyzed. It will be found to contain 6.5 gm./liter vanadium (as V) and less than 0.01 gm./liter of iron (as Fe). The aqueous acid sulfate solution from which the vanadium has been extracted (the raffinate) is then neutralized, in accordance with this invention, to pH 6.5 by addition of magnesium carbonate to precipitate the hydroxides of iron, aluminum, chromium, manganese and any residual vanadium which are separated by filtration. The filtrate containing magnesium sulfate is evaporated until it contains 40% by weight $MgSO_4$ and is then cooled to about 80° F. and allowed to crystallize. Crystals of $MgSO_4.7H_2O$ are separated by centrifuging and weigh 350 gm. The mother liquor will contain 420 gm. $MgSO_4$.

I claim:

1. A process for recovering vanadium values from an acidic sulfate solution containing vanadium in the pentavalent state, iron and other metal values comprising the steps of (1) partially neutralizing said solution by adding sufficient basic magnesium compound selected from the group consisting of magnesium oxide, magnesium hydroxide, magnesium carbonate and mixtures thereof to adjust the pH to a value in the range of 1.2 to 3.2; (2) contacting the resulting partially neutralized solution with an organic amine or quarternary ammonium compound to extract vanadium values from the aqueous to the organic phase; (3) separating the two phases; (4) neutralizing the vanadium free aqueous phase by adding sufficient basic magnesium compound selected from the group consisting of magnesium oxide, magnesium hydroxide, magnesium carbonate and mixtures thereof to adjust the pH to a value of at least 3.5 to precipitate hydroxides of iron and other metals; (5) separating said hydroxides; (6) recovering magnesium sulfate from the remaining solution and; (7) recovering vanadium values from the organic phase separated in step (3).

2. The process of claim 1 wherein the pH is adjusted to a value in the range of 1.5 to 3.0 in step (1).

* * * * *